United States Patent [19]

de Wit et al.

[11] Patent Number: 4,651,677
[45] Date of Patent: Mar. 24, 1987

[54] APPARATUS FOR PREVENTING SHOATS FROM BEING CRUSHED TO DEATH IN HOG BREEDING OPERATIONS AND THE USE THEREOF AS A DEVICE FOR INDICATING THE START OF THE DAM'S BIRTHING PROCEDURE

[76] Inventors: Paulus A. J. de Wit, Beukenlaan 25; Jitze Bouma, Beukenlaan 27, both of 9363 CE Marum, Netherlands

[21] Appl. No.: 744,971

[22] Filed: Jun. 17, 1985

[30] Foreign Application Priority Data

Jun. 29, 1984 [DE] Fed. Rep. of Germany ....... 3423934
Nov. 27, 1984 [DE] Fed. Rep. of Germany ....... 3443152

[51] Int. Cl.⁴ .................................................. A01K 1/02
[52] U.S. Cl. .......................................... 119/20; 119/28
[58] Field of Search ............... 119/1, 20, 28; 367/197, 367/198

[56] References Cited

U.S. PATENT DOCUMENTS 3,533,095 10/1970 Collins ............................... 119/28 X
4,264,900 4/1981 Charlier .............................. 119/1 X
4,417,235 11/1983 Del Grande ..................... 367/197 X

*Primary Examiner*—Hugh R. Chamblee
*Attorney, Agent, or Firm*—Merchant, Gould, Smith, Edell, Welter & Schmidt

[57] ABSTRACT

Apparatus for preventing shoats from being crushed to death in hog breeding operations with at least one microphone associated with a farrowing pen accommodating the dam and the shoat, a noise detector which is connected to the microphone and which releases an electrical pulse based upon a stored acoustic signal serving as a comparison signal, and with a warning unit adapted to be actuated by the pulse released by the said noise detector. This apparatus may be used as a device for indicating the onset of the dam's birthing procedure.

15 Claims, 2 Drawing Figures

APPARATUS FOR PREVENTING SHOATS FROM BEING CRUSHED TO DEATH IN HOG BREEDING OPERATIONS AND THE USE THEREOF AS A DEVICE FOR INDICATING THE START OF THE DAM'S BIRTHING PROCEDURE

FIELD OF THE INVENTION

The invention relates to an apparatus for preventing shoats from being crushed to death in hog breeding operations, in which the dam and the shoats are accommodated jointly in a farrowing pen.

BACKGROUND OF THE INVENTION

In hog breeding, there is always the problem of the dam crushing the newly born shoat when the frequently very heavy dam lies down or when, while lying down, she changes from one position to another. Up to now, there have been many attempts to provide structures to prevent this crushing of shoats, the said structures being known as shoat protecting cages. In spite of these cages, it is always possible, especially during the first three to six days after the birth, for the shoats to stray under the moving dam.

Attempts have also been made to solve this problem by providing a source of heat in an area of the farrowing pen remote from the dam, in order to induce the shoat to move away from the dam to this warm area and to remain there. This has been partly successful but, since the shoats naturally wishes to suck from the dam, and are unquestionably attracted by the dam's odor, this idea is only partly satisfactory.

Extensive investigations in the European Common Market have shown that in shoat raising operations equipped with the best protective devices known today, there is still a 6.2% loss due to crushing of the shoats.

SUMMARY OF THE INVENTION

It is, therefore, the purpose of the invention to provide an apparatus which will allow the breeder to eliminate this considerable loss.

This purpose is accomplished as set forth in the characterizing portion of claim 1.

Advantageous configurations of the apparatus according to claim 1 are contained in the sub-claims.

The invention is based upon the consideration and knowledge that when a shoat gets under a dam, the air being driven out of its lungs causes the shoat to emit a specific cry or to release specific noises known to hog breeders as the "shoats death cry."

In the case of small, particularly rural operations, if the breeder or the farmer is in the stable, he reacts to this death cry and causes the dam to move away from the shoat. In large breeding operations, however, this is no longer possible today.

According to the invention, therefore, use is made of a noise detector which, from the profusion of noises arising in a breeding stall, reacts only to one specific noise, i.e., a specific frequency of the noise detector is used as a control frequency. The noises are picked up by appropriate microphones, and are passed to the noise detector. As soon as the acoustic frequency to which it is set occurs, the said noise detector releases an electrical pulse which actuates a suitable warning unit.

Practical tests have shown that the noise detector may be connected to a copper mat arranged in the area where the dam lies. When the warning pulse is released by the detector, an electrical shock is released to the mat, and this immediately causes the dam to stand up or turn over, thus possibly rescuing the shoat from being crushed.

According to the invention, it is possible to use one noise detector for a plurality of farrowing pens, or to provide a detector for each pen. It is also possible, according to the invention, to use one or more microphones per farrowing pen or to provide one microphone for a plurality of pens.

The warning pulse produced by the noise detector may be passed not only to the dam, but also to the person monitoring the stable, to enable him to react immediately. Simultaneously with the impulse, it is possible to provide an indication as to which of the farrowing pens has a problem. It is, of course, possible to feed the pulse simultaneously both to the dam and to the monitor. In order to motivate the dam, it is also possible to use a flashlight activated by the warning pulse instead of the electric shock.

The invention also proposes that the connection between the microphones and the noise detector, and/or the connection between the noise detector and the warning unit be effected, not by laying cables, but by radio waves. This not only provides a considerable reduction in installation costs, but also keeps possible sources of trouble as few as possible.

It is also proposed to provide a belt which is worn by the dam and is a more reliable way of transmitting the warning pulse. An arrangement of this kind also reduces installation costs.

Instead of the belt, it is also possible to provide other warning devices worn by the animal itself, for example a small receiver which is secured to the animal.

Since it has been found that animals react very differently to the warning pulses released, it is also proposed, according to the invention, that the shock intensity of the warning unit be adjustable, so that the shock may be matched with the individual constitution of a dam.

Finally, it is proposed, according to the invention, that the pick-up sensitivity of the microphones used be adjustable. This allows adaption to different stable conditions to be carried out even by a layman.

Whereas the problems arising with a farrowing cage have been explained hereinbefore, it also lies within the scope of the invention to use an apparatus of this kind also in the case of a dam who is about to deliver. Thus in the case of large cattle breeding operations, the person monitoring the stable may be informed of the time of birth and can thus be available to provide assistance. It has been found, in effect, that animals make certain noises just before birth, which give an unmistakable indication of the imminence of the event.

BRIEF DESCRIPTION OF THE DRAWINGS

An example of embodiment of the invention, in conjunction with a farrowing pen, is explained hereinafter in the light of the drawing attached hereto, wherein.

BRIEF DESCRIPTION OF THE PREFERRED EMBODIMENT

Figure 1:
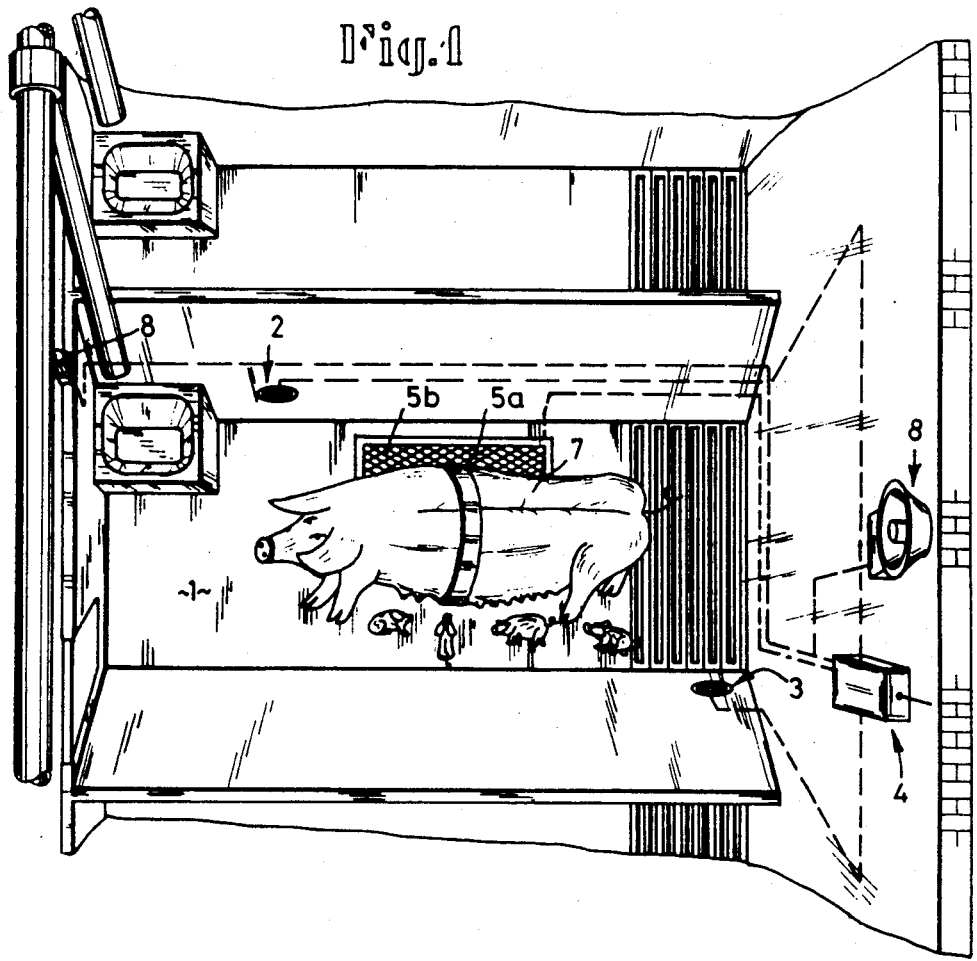
FIG. 1 is a diagrammatic view of a farrowing pen from above.
Figure 2:
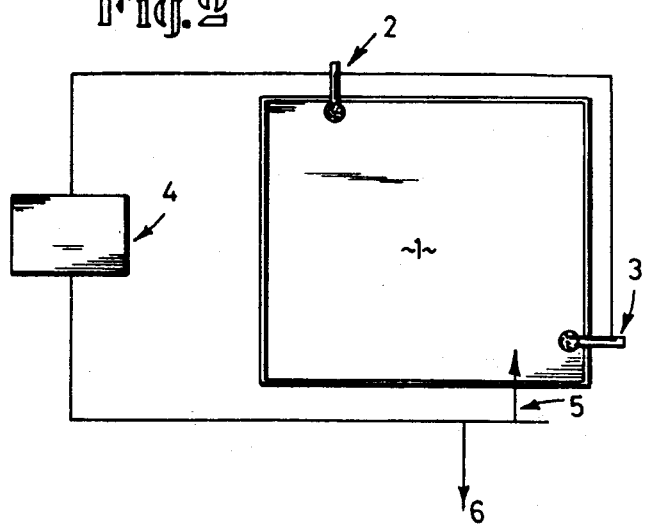
FIG. 2 is a diagram clarifying the invention.

In the drawing, 1 is a farrowing pen with which two microphones 2 and 3 are associated. The said microphones are connected to a noise detector 4 which, out of the noises picked by the microphones, filters only the noise to which it is set. When this noise occurs, the said noise detector releases an electrical pulse to a warning unit 5.

The said warning unit may be in the form of a belt 5a carried by the animal 7, or of an electrically conductive mat 5b which is arranged in the area where the dam lies and which, when activated, releases an electrical shock.

Noise detector 4 may also be provided with a branch 6 which, in contrast to warning unit 5, does not run to animal 7, but to a warning device 8 for the person monitoring the stall, e.g., a loud speaker or a warning lamp.

The connection between the microphone or microphones 2, 3 and the noise detector 4, and/or the connection between the detector 4 and the warning unit 5, may be effected without wires, for example by radio waves, or by appropriate electrical conductors.

Since the major risk of shoats being crushed exists during the first six days, the installation as a whole need be activated only during this period of time. If necessary, therefore, it may be used for a plurality of farrowing pens.

What is claimed is:

1. An apparatus for preventing shoats from being crushed to death in hog breeding operations, in which the dam and the shoat are accommodated jointly in a farrowing pen, comprising: at least one microphone (2, 3) associated with the farrowing pen (1), a noise detector (4) connected to the said microphone, which, upon being fed with an acoustic signal from said microphone corresponding to a stored comparison noise signal, releases an electrical pulse, and a warning unit (5) activated by the pulse released by said noise detector (4).

2. An apparatus according to claim 1 wherein the connection between the microphone or microphones (2, 3) and the noise detector (4), and/or the connection between the detector (4) and the warning unit (5), is effected without wires, e.g., by radio waves.

3. An apparatus according to claim 1 wherein the warning unit (5) comprises a mat which is arranged in the area in which the dam lies, said mat being electrically conductive and releasing a surge of electrical current when activated, said mat including pick-up means to activate a source electric current whereby the dam receives a shock.

4. An apparatus according to claim 1 wherein the warning unit (5) is in the form of a flashlight arranged in the area in which the dam lies.

5. An apparatus according to claim 1 wherein the warning unit is located in the vicinity of the operator in charge of monitoring pen (1).

6. An apparatus according to claim 1 wherein the noise detector (4) is associated with a plurality of farrowing pens (1).

7. An apparatus according to claim 1 wherein the noise detector (4) is equipped with a counting unit for the pulses which it releases to the warning unit.

8. An apparatus according to claim 1 wherein the pick-up sensitivity of the microphone, or microphones may be adjusted to match local conditions.

9. An apparatus according to claim 1 wherein the shock intensity of the warning unit may be regulated.

10. Apparatus according to claim 1 wherein the device is used for indicating the start of the birthing procedure for dams which are about to give birth.

11. An apparatus according to claim 1 wherein the warning unit (5) is in the form of an electrically conductive belt which is worn by the dam and which releases a surge of electrical current when the pulse is released by the noise detector (4), said belt including pick-up means to activate a source electric current whereby the dam receive a shock.

12. An apparatus according to claim 11 wherein other warning units, carried by the animal, and reacting to the pulse released by the noise detector are provided.

13. An apparatus for preventing shoats from being crushed to death in hog breeding operations, in which the dam and the shoat are accommodated jointly in a farrowing pen, comprising: at least one microphone (2, 3) associated with the farrowing pen (1), a noise detector (4) connected to said microphone, which, upon being fed with an acoustic signal from said microphone corresponding to a stored comparison noise signal, releases an electrical pulse and a warning unit (5) activated by the pulse released by said noise detector (4), said warning unit (5) including a mat which is arranged in an area in which the dam lies, said mat being electrically conductive and releasing a surge of electrical current when activated, said mat having pick-up means to activate a source electric current whereby the dam receives a shock.

14. An apparatus for preventing shoats from being crushed to death in hog breeding operations, in which the dam and the shoat are accommodated jointly in a farrowing pen, comprising: at least one microphone (2, 3) associated with the farrowing pen (1), a noise detector (4) connected to said microphone, which, upon being fed with an acoustic signal from said microphone corresponding to a stored comparison noise signal, releases an electrical pulse and a warning unit (5) activated by the pulse released by said noise detector (4) said warning unit (5) is in the form of an electrically conductive belt which is worn by the dam and which releases a surge of electrical current when the pulse is released by the noise detector (4), said belt including pick-up means to activate a source electric current whereby the dam receives a shock.

15. An apparatus for preventing shoats from being crushed to death in hog breeding operations, in which the dam and the shoat are accommodated jointly in the farrowing pen, comprising: at least one microphone (2, 3) associated with the farrowing pen (1), a noise detector (4) connected to said microphone, which, upon being fed with an acoustic signal from said microphone corresponding to a stored comparison noise signal, releases an electrical pulse and a warning unit (5) activated by the pulse released by said noise detector (4), wherein the warning unit (5) is in the form of a flashlight arranged in the area in which the dam lies.

* * * * *